United States Patent
Griffin et al.

(10) Patent No.: US 9,552,579 B2
(45) Date of Patent: *Jan. 24, 2017

(54) NEAR FIELD COMMUNICATION ACTIVATION AND AUTHORIZATION

(71) Applicant: PAYPAL, INC., San Jose, CA (US)

(72) Inventors: Kent Griffin, San Jose, CA (US); Carl Stone, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/955,011

(22) Filed: Nov. 30, 2015

(65) Prior Publication Data

US 2016/0086164 A1    Mar. 24, 2016

Related U.S. Application Data

(63) Continuation of application No. 14/457,363, filed on Aug. 12, 2014, now Pat. No. 9,224,140, which is a
(Continued)

(51) Int. Cl.
*G06F 21/00* (2013.01)
*G06Q 20/32* (2012.01)
(Continued)

(52) U.S. Cl.
CPC ......... *G06Q 20/3278* (2013.01); *G06Q 20/10* (2013.01); *G06Q 20/102* (2013.01); *G06Q 20/105* (2013.01); *G06Q 20/108* (2013.01); *G06Q 20/322* (2013.01); *G06Q 20/3821* (2013.01); *G06Q 20/3829* (2013.01); *G06Q 20/40* (2013.01); *G06Q 20/4012* (2013.01); *G06Q 20/425* (2013.01); *G06Q 30/06* (2013.01); *G06Q 30/0601* (2013.01); *H04B 5/00* (2013.01); *H04L 63/06* (2013.01); *H04L 67/04* (2013.01); *H04W 12/06* (2013.01)

(58) Field of Classification Search
USPC .............................................................. 726/2
See application file for complete search history.

(56) References Cited

U.S. PATENT DOCUMENTS 5,428,602 A    6/1995    Kemppainen
6,175,922 B1   1/2001    Wang
(Continued)

OTHER PUBLICATIONS

Ahmavaara et al., "Interworking Architecture Between 3GPP and WLAN Systems", Integration of Wireless LAN and 3G Wireless, IEEE Communications Magazine, Nov. 2003, pp. 74-81.

*Primary Examiner* — Jason Lee
(74) *Attorney, Agent, or Firm* — Haynes and Boone, LLP (57) ABSTRACT

A method of activation and authorization of a near field communication (NFC) enabled device comprising: receiving login information from an NFC enabled device; sending packet data via a network in response to receiving the login information from the NFC enabled device; and receiving corresponding data from the NFC enabled device in response to the sending of the packet data, the sending of the packet data and the receiving of the corresponding code facilitates the activation and authorization of the NFC enabled device, and the subsequent activation of the NFC device via a NFC link without further authorization of the NFC enabled device, is described herein.

20 Claims, 8 Drawing Sheets

Related U.S. Application Data continuation of application No. 12/241,557, filed on Sep. 30, 2008, now Pat. No. 8,813,182.

(60) Provisional application No. 61/024,758, filed on Jan. 30, 2008, provisional application No. 61/034,890, filed on Mar. 7, 2008.

(51) Int. Cl.

| | | |
|---|---|---|
| *G06Q 20/10* | (2012.01) | |
| *G06Q 20/38* | (2012.01) | |
| *G06Q 20/40* | (2012.01) | |
| *G06Q 30/06* | (2012.01) | |
| *H04B 5/00* | (2006.01) | |
| *H04L 29/08* | (2006.01) | |
| *H04L 29/06* | (2006.01) | |
| *H04W 12/06* | (2009.01) | |
| *G06Q 20/42* | (2012.01) | |

(56) References Cited

U.S. PATENT DOCUMENTS

| | | |
|---|---|---|
| 6,282,656 B1 | 8/2001 | Wang |
| 6,594,759 B1 | 7/2003 | Wang |
| 6,850,916 B1 | 2/2005 | Wang |
| 7,107,246 B2 | 9/2006 | Wang |
| 7,174,130 B2 | 2/2007 | Kurisko et al. |
| 7,330,714 B2 | 2/2008 | Rosenberg |
| 7,447,765 B2 | 11/2008 | Aerrabotu et al. |
| 7,562,813 B2 | 7/2009 | Humphrey et al. |
| 7,635,084 B2 | 12/2009 | Wang et al. |
| 7,702,538 B2 | 4/2010 | Rau et al. |
| 7,784,684 B2 | 8/2010 | Labrou et al. |
| 2002/0023215 A1 | 2/2002 | Wang et al. |
| 2002/0065099 A1 | 5/2002 | Bjorndahl |
| 2004/0147246 A1 | 7/2004 | Kim |
| 2004/0259499 A1 | 12/2004 | Oba et al. |
| 2006/0219776 A1* | 10/2006 | Finn ............ B60R 25/25 235/380 |
| 2007/0032193 A1 | 2/2007 | Wada et al. |
| 2007/0032195 A1 | 2/2007 | Kurisko et al. |
| 2007/0143828 A1 | 6/2007 | Jeal et al. |
| 2008/0020707 A1 | 1/2008 | Takayama et al. |
| 2008/0147548 A1 | 6/2008 | Jiang |
| 2008/0162341 A1 | 7/2008 | Zimmer et al. |
| 2009/0004969 A1* | 1/2009 | Luong ............ H04W 84/18 455/41.1 |
| 2009/0111378 A1 | 4/2009 | Sheynman et al. |

* cited by examiner

Typical Request Money

1. Recipient sends request to PayPal (amount, sender id)
2. PayPal sends request to sender (amount, recipient id)
3. Sender authorizes payment.
4. PayPay notifies the recipient

FIG. 8A

Request Money over NFC

1. Recipient sends request to sender over NFC (amount, recipient id)
2. Sender authorizes payment.
3. PayPay notifies the recipient

NEAR FIELD COMMUNICATION ACTIVATION AND AUTHORIZATION

RELATED APPLICATIONS

This application is a continuation of and claims priority to U.S. patent application Ser. No. 14/457,363, filed Aug. 12, 2014, which is a continuation of U.S. patent application Ser. No. 12/241,557, filed Sep. 30, 2008, now U.S. Pat. No. 8,813,182, issued on Aug. 19, 2014, which claims priority and the benefit of U.S. Provisional Patent Application No. 61/024,758, filed Jan. 30, 2008; and U.S. Provisional Patent Application No. 61/034,890, filed Mar. 7, 2008, the entire disclosures of which are incorporated herein by reference.

BACKGROUND

Field of the Invention

The present disclosure relates generally to financial transactions and more particularly to peer-to-peer payment between mobile devices using near field communication in a network environment.

Related Art

Arguably, mobile phones are currently the most widespread mobile computing device in the world. They have become ubiquitous companions in our life, enabling communication nearly anytime and anywhere to facilitate information access to mobile services and the Internet. In addition, mobile phones have become multimedia computing platforms with integral digital cameras for taking pictures and video, playing music, recording conversations, and for organizing our lives.

Using physical objects as entry points to data and services can ease mobile communication and information access. Augmentation of the environment enables physical mobile interactions, which involve a user, a mobile device, and a physical object or another mobile device. The object is augmented with some kind of technology and subsequently stores information. The information is typically associated with a mobile service that might be triggered through an interaction with the physical object. Physical mobile interactions make it possible to bridge the gap between the physical and virtual world. In order to support communication between the mobile device and the augmented object, communication technologies are required.

Different short-range communication technologies have been integrated into mobile devices in recent years. The process began with infrared transceivers for synchronizing applications with a desktop computer. Bluetooth technology evolved and overcame some of the problems experienced with infrared. However, when attempting to connect two devices with Bluetooth the setup is often lengthy and is very often not user-friendly.

Radio Frequency Identification (RFID) is another technology that has been easily integrated into mobile devices such as cell phones, PDAs, or computers. RFID works with active communication devices (transceiver or read-write device) and passive non-powered tags (transponder). The tags are relatively small, inexpensive, and can store information making them suitable for augmenting physical objects unobtrusively. The transponder is attached to objects that are to be identified and contains information such as product price or vehicle identification, for example. The transceiver emits an electromagnetic signal that activates the tag and enables the transceiver to read the tag's information and/or alter it, assuming the tag is re-writeable. Usually, the transceiver is in communication with a computer or similar device to which the information is passed.

Near Field Communication, herein referred to a "NFC" is the most recently explored technology for object augmentation to bring mobile devices and physical objects together to enable a user to interact with the augmented objects for information and/or data communication.

Figure 1:
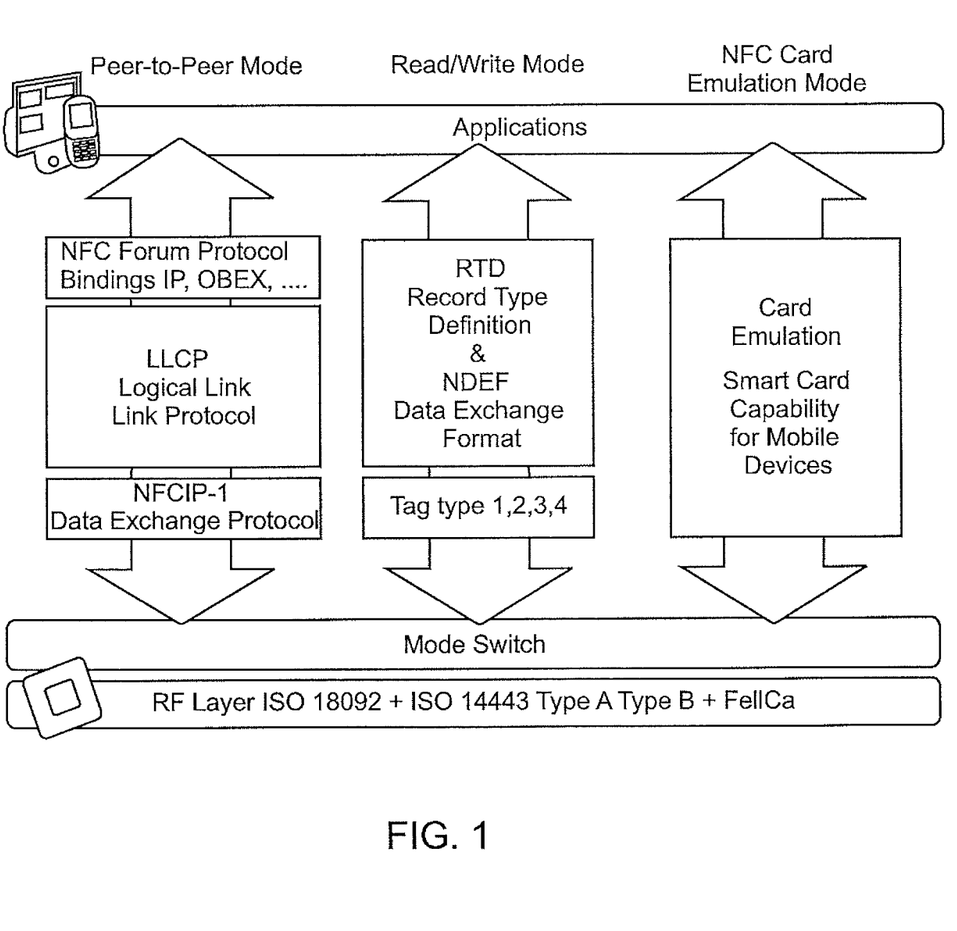
FIG. 1 shows that an NFC enabled device can read out an RFID tag's information, emulate a smart card so that a reader can access its data, or communicate directly with another NFC device in peer-to-peer fashion when the two NFC devices are brought in close proximity or in direct contact.

In this regard, NFC is a short range high frequency wireless communication technology that enables the exchange of data between devices over a relatively short distance. NFC is based on RFID technology and uses many of the same working principles. The technology is standardized in ISO/IEC 18092 (International Organization for Standardization/International Electrotechnical Commission), ECMA-340 (European association for standardizing information and communication systems), and ETSI 102.190 (European Telecommunications Standards Institute). All of these standards define the NFC Interface and Protocol-1 (NFCIP-1), see FIG. 1, which specify the modulation schemes, coding, transfer speeds and frame format of the RF interface of NFC devices, as well as initialization schemes and conditions required for data collision-control during initialization for both passive and active NFC modes.

NFC is also standardized in ISO/IEC 21481 and ECMA 352, which corresponds to NFC Interface and Protocal-2 (NFCIP-2). The NFCIP-2 standard specifies the mechanism to detect and select one communication mode out of three possible communication modes typical of NFC devices (Peer-to-Peer, Read/Write Card, and Card Emulation), as further shown in FIG. 1.

NFC is compatible with ISO/IEC 14443 type A and type B (proximity cards operating at a maximum distance of 20 cm), ISO/IEC 15693 (vicinity cards operating at a distance from 10 cm to 2 m), and to the FeliCa contactless smart card system. Accordingly, an NFC device can communicate with both exiting ISO 14443 smartcards and readers, as well as with other NFC devices, and is compatible with existing contactless infrastructure already in use for, among other things, public transportation, payment, and promotion/advertising.

As mentioned above and shown in FIG. 1, a key feature of NFC devices is that the NFC chip that is integrated into the NFC device can read out an RFID tag's information, emulate a smart card so that a reader can access its data, or communicate directly with another NFC device in peer-to-peer fashion when the two NFC devices are brought in close proximity or together. In other words, NFC technology enables communication between devices that both have active power and computing capabilities, as well as communication between powered devices and passive tags.

For operating in Reader Mode it is sufficient to hold the NFC device near a compatible tag that stores some information (typically 1 Kb-4 kb). This information could be, for example, a bookmark of a company website in the company advertising poster, a timetable of a bus near a bus stop, some tourist information beside works of art near a museum, etc. With peer-to-peer communication mode it is possible, for example, to synchronize calendars between two NFC PDAs, or to set-up networks (Bluetooth, Wi-Fi, etc.) simply by holding the two NFC devices in close proximity to each other. In card emulation mode, the NFC device can host virtual payment cards and enable the user to make payments. For example, it is possible to buy a travel ticket while providing management of associated customer loyalty and bonus programs. In card emulation mode it is also possible to control access, i.e., the NFC device acts as a key.

Prior to utilizing many known NFC devices for the first time, some sort of pre-operationally process is typically required. In this regard, the present disclosure describes an activation and authorization process that may provide security features, as well as check NFC device compatibility and pre-configure the device accordingly.

SUMMARY

For purposes of summarizing the disclosure, exemplary embodiments of peer-to-peer payments between mobile devices using near field communication in a network environment have been described herein.

In one embodiment, a method of activation and authorization of a near field communication (NFC) enabled device comprises transmitting login compiled information via a network; receiving packet data in response to the login information; transmitting a corresponding code in response to the packet data received, the receiving of the packet data and the transmitting of the corresponding code facilitates the activation and authorization of the NFC enabled device; storing the packet data in the NFC enabled device; and activating the NFC enabled device via an NFC link, wherein the stored packet data permits the subsequent activating of the NFC enabled device via the NFC link without further authorizing of the NFC enabled device.

In another embodiment, a method of activation and authorization of a near field communication (NFC) enabled device comprises receiving login information from an NFC enabled device; sending packet data via a network in response to receiving the login information from the NFC enabled device; and receiving corresponding data from the NFC enabled device in response to the sending of the packet data, the sending of the packet data and the receiving of the corresponding code facilitates the activation and authorization of the NFC enabled device, and the subsequent activation of the NFC device via a NFC link without further authorization of the NFC enabled device.

These and other embodiments will become readily apparent to those skilled in the art from the following detailed description of the various embodiments having reference to the attached figures, the invention not being limited to any particular preferred embodiment(s) disclosed.

Embodiments of the invention are understood by referring to the detailed description that follows. It should be appreciated that like reference numerals are used to identify like elements illustrated in one or more of the figures, wherein showings therein are for purposes of illustrating embodiments of the invention and not for purposes of limiting the same.

DETAILED DESCRIPTION

Exemplary embodiments will now be described with references to the accompanying figures, wherein like reference numbers refer to like elements throughout. The terminology used in the description presented herein is not intended to be interpreted in any limited or restrictive manner simply because it is being utilized in conjunction with a detailed description of certain embodiments. Furthermore, various embodiments (whether or not specifically described herein) may include novel features, no single one of which is solely responsible for its desirable.

As indicated above, NFC is a short-range wireless connectivity technology that evolved from a combination of existing contactless identification and interconnection technologies. Operating at 13.56 MHz via magnetic field induction (two loop antennas are located within each other's near field) and transferring data at up to 424 Kbits/second, NFC provides simple communication between electronic devices. This means that no restrictions are applied and no licenses are required for use of the NFC devices in the RF band. NFC is both a "read" and "write" technology. Furthermore, combining the read and write modes in more than two mobile devices enables a third peer-to-peer mode by alternating between read and write modes. As indicated above, the underlying layers of NFC technology follow universally implemented ISO, ECMA, and ETSI standards. Because the transmission range of NFC is short, NFC-enabled transactions are relatively secure. However, relatively higher layer cryptographic protocols such as TLS, SSL, or the like, may be used.

In this regard, the NFC interface and protocols primarily target consumer electronics users that will be able to use the secure means of communication between various devices without exerting much effort in configuring their "network". Communication between two NFC-compatible devices occurs when they are brought in close proximity with a wave or touch of the device(s). This action will engage the NFC wireless devices interfaces and configure them to link up in a peer-to-peer network allowing for the automated and transparent establishment of the network connection between the devices.

NFC protocol distinguishes between an Initiator device and a Target device of the NFC network communication. Any device may be either an Initiator or a Target. The Initiator, as indicated by the name, is the device that initiates and controls the exchange of data. The Target is the device that answers the request from the Initiator. A device may also be both initiator and target as described in the peer-to-peer mode.

NFC protocol further distinguishes between two modes of operation: Active mode and Passive mode. All devices support both communication modes. In the active mode of communication, both devices, i.e., the Initiator and the Target, generate their own RF field to carry the data. In the passive mode of communication, only one device (Initiator) generates the RF field while the other device (Target) uses load modulation to transfer the data. The may be an important factor for battery-powered devices since conservation of energy is generally a high priority. As such, the protocol allows a device, such as a mobile phone, to operate in a power-saving mode (passive mode of NFC communication). In other words, the passive mode does not require both devices to generate the RF field and allows the complete communication to be powered from one side only. (The device will still need to be powered internally, but it does not have to "waste" the battery on powering the RF communication interface.)

The difficulty in using long-range protocols like Bluetooth and Wireless Ethernet (Wi-Fi) is in selecting the correct device from a multitude of devices in the operating range and providing the right parameters to the connection. However, NFC overcomes this difficulty as once the configuration data has been exchanged using NFC, the devices can setup and continue to communicate for longer range and faster protocols using Bluetooth or Wireless Ethernet (Wi-Fi).

Figure 2:
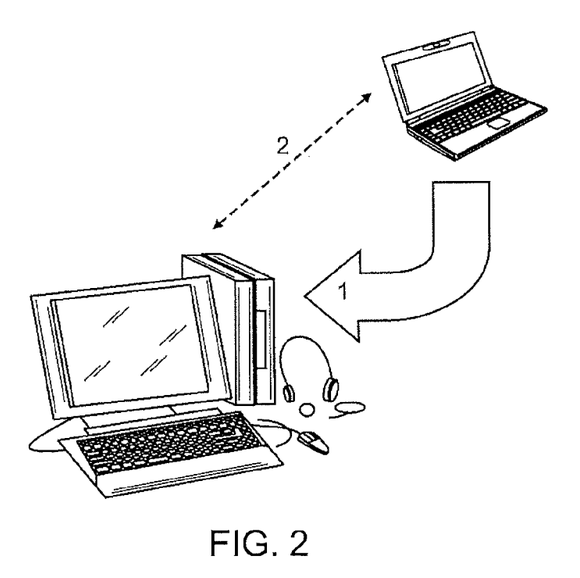
FIGS. 2 and 3 show the establishment of Bluetooth or a similar short range technology communication between two computers using NFC.
Figure 3:
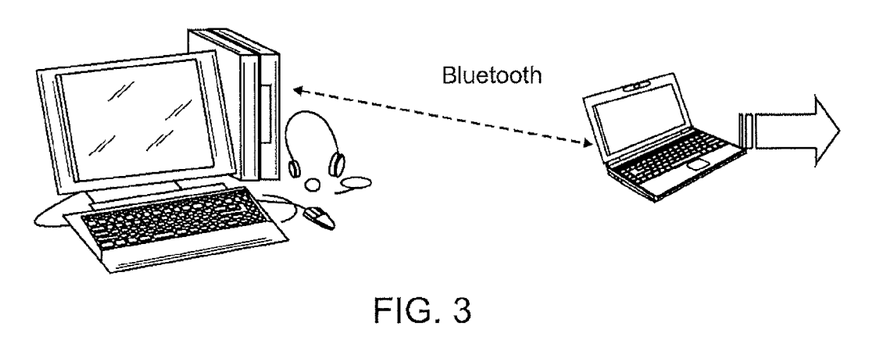

For example, as represented by the double arrowhead labeled (2) in FIG. 2, ordinarily, to establish Bluetooth communication between two computers, the two devices would have to be setup manually with a password to protect communication. However, as shown by the arrow labeled (1) in FIG. 2, NFC may be used as a first step in establishing, e.g., a Bluetooth communication link by simply touching the two devices together or bringing the two devices into close proximity with each other. By touching the devices at a "hotspot," they will open a data connection to exchange the parameters of the Bluetooth communication and establish a secret key without any further action required on the part of the user. As shown in FIG. 3, once Bluetooth communication is established, the devices can be moved away from each other in a second step as communication between the devices continues using the session of Bluetooth that was previously established.

Figure 4:
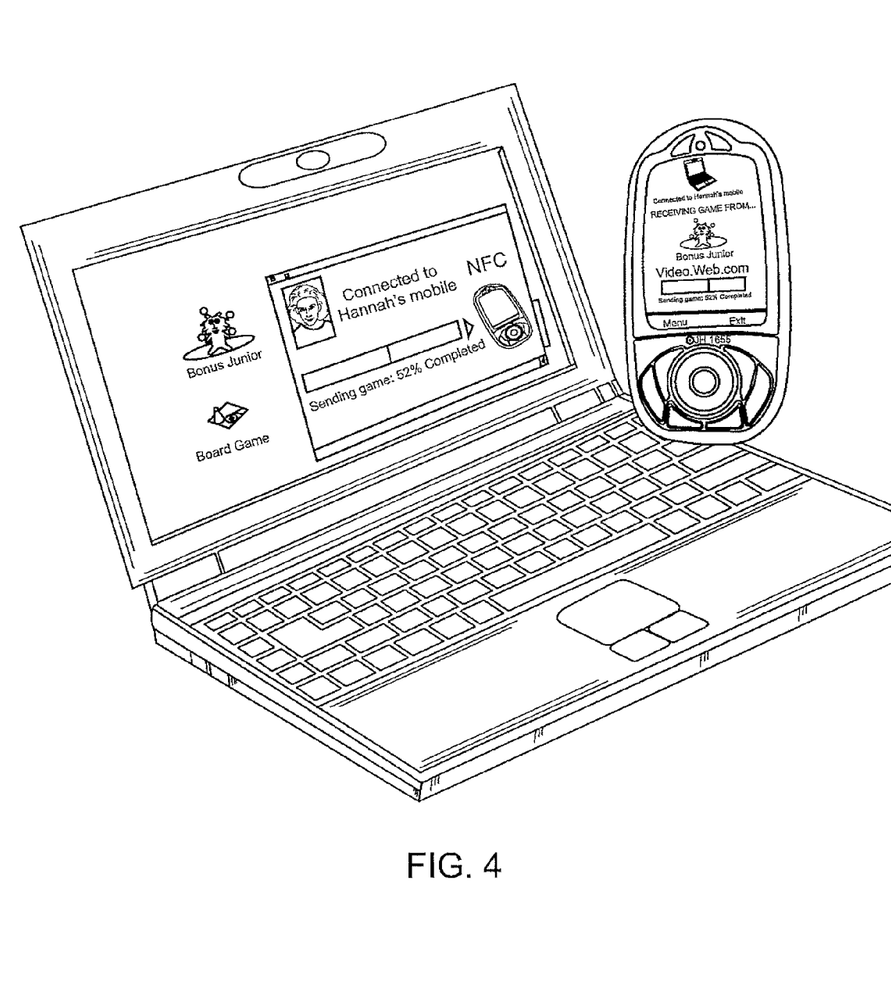
FIG. 4 shows the use of an NFC enabled computer (PC) and NFC enabled mobile phone to download a game application from a website directly into the mobile phone.

Substantially the same NFC procedure may be used to establish a wireless (Bluetooth, Wi-Fi, etc.) connection with a variety of devices, from mobile phones that enable payment or transfer of information to digital cameras that send their photos to a television set with just a touch. For example, as shown in FIG. 4, by using an NFC enabled personal computer (PC) and an NFC enable mobile phone, a game application may be downloaded from a website directly into the mobile phone from the PC.

NFC capabilities further include information access via smart poster application. In this example, the user touches the NFC enabled mobile phone against a tag embedded in a poster or similar object, which triggers the transmission of a URL to the phone. The URL could be used, for example, to direct a user to a website where the user can gather information or download a special coupon or token.

Figure 5:
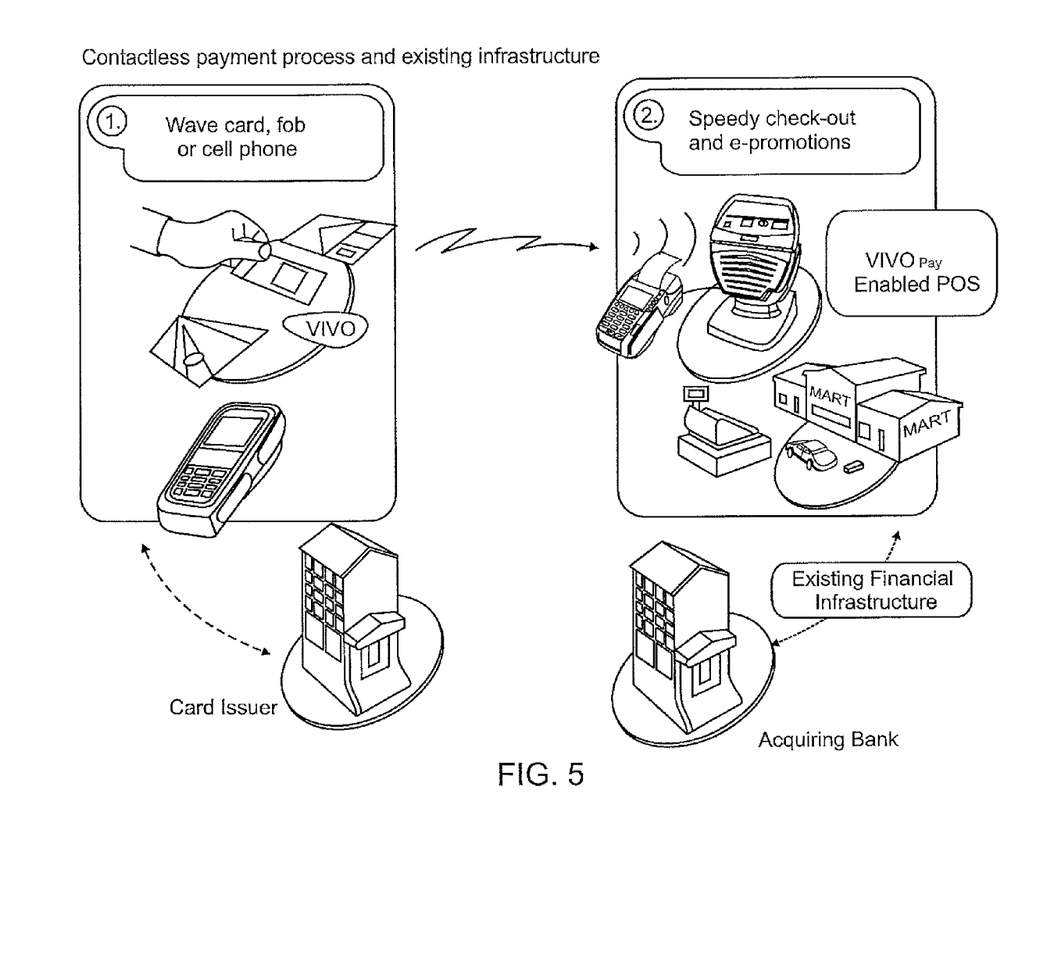
FIG. 5 shows an example of NFC devices communicating consumer account information via radio frequency to a retailer's payment terminal.

As shown in FIG. 5, other examples of NFC applications include mobile cell phones, cards, or key fobs that have a built-in integrated circuit (IC) chip and antenna. The chip is able to emulate contactless smart cards. Consumers use the NFC device to communicate consumer account information via radio frequency to a retailer's payment terminal such as the VIVOpay line of contactless payment systems manufactured by VIVOtech. The payment terminal then connects to the appropriate financial networks or other back-end processing system to authorize the transaction. Once authorized, the consumer completes the transaction and receives payment confirmation.

Mobile cell phones or "wallet phones" may include a prepaid wallet that can be used for mobile payment. Users interact with readers at point of sale (POS) terminals; cash machines to recharge the wallet; and access control systems located, for example, at train stations, airports, hotels, etc., using the wallet phone to make purchases.

Figure 6:
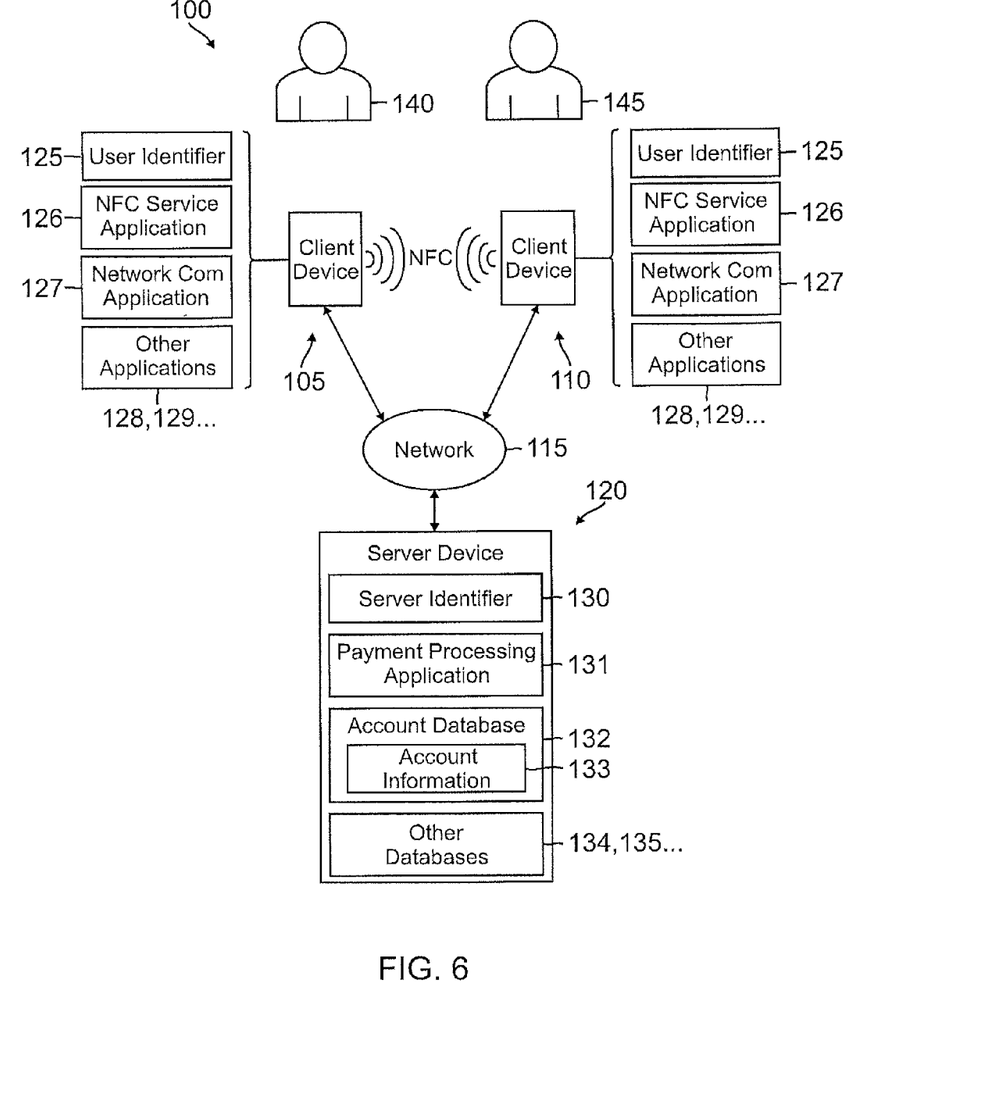
FIG. 6 shows system and method for enabling a peer-to-peer financial transaction between mobile devices using near field communication in a network environment in accordance with one embodiment.

FIG. 6 shows a system and method for enabling a peer-to-peer financial transaction between mobile devices using near field communication in a network environment in accordance with one embodiment. The system and method for enabling a peer-to-peer financial transaction between mobile devices 100 may include a first NFC enabled mobile device 105 and a second NFC enabled mobile device 110, a network 115 to enable connectivity between entities/elements and the flow of information, and a third party payment provider system 120 (PPS) for, among other things, payment processing (verification, authorization, and confirmation) of the financial transaction between the mobile devices 105, 110, as well as the debiting and crediting of appropriate user accounts associated with each user 140 and 145.

As used herein, the term "mobile device" is a broad term and may include, but is not limited to a cell phone, PDA, key fob, smartcard, computer or PC, or similar type of augmented object or device.

Each of the mobile devices 105, 110 are NFC enabled and may include, among other things, a user identifier 125, NFC service application 126, network communication application 127, and other applications 128, 129, etc., including a payment provider application, a browser application, a toolbar application, etc., as may be necessary to enable NFC communication between the mobile devices 105, 100 and the payment provider system 120 via the network 115.

Broadly, the NFC service application 126 provides those features that generally enable NFC communication between NFC enabled devices, but may also enable the user to activate various multimedia features, as well as enable financial transactions via "send money", "request money", "send contact information", "acquire contact information", etc., icon linked applications.

Likewise, the payment provider application provides those features that generally enable the mobile device 105, 110 to communicate with the payment provider system 120, but may also enable the user to activate various multimedia features, as well as enable financial transactions via "send money", "request money", "send contact information", "acquire contact information", etc., icon linked applications.

Accordingly, persons of ordinary skill in the art will understand that the use of a NFC service application and a payment provider application, or the use of a single bundled application that is the functional equivalent of the NFC service application and the payment provider application in any mobile device depends on a number of factors included manufacturer preference, cost, and intended use, to name a few. Accordingly, the term "application", "applications", or "application(s)" as used herein indicates that an NFC service application, payment provider application, or a bundle application having capabilities of both the NFC service application and the payment provider application is present in the mobile device.

In one embodiment, the network 115 may be implemented as a single network or a combination of multiple networks. For example, in various embodiments, the network may include the Internet and/one or more intranets, landline networks, wireless networks, and/or other appropriate types of communication networks. In another example, the network may comprise a wireless telecommunications network (e.g., cellular phone network) adapted to communicate with other communication networks, such as the Internet.

The payment provider system 120 may include, among other things, a server identifier 130, a payment processing application 131, and an account database 132 having account information 133 and other databases 134, 135, etc., as may be required to enable payment processing between the mobile devices 105, 110.

In one embodiment, a financial transaction between mobile devices 105, 110 may include the transfer or sending of money from the first mobile device 105 (sender) to the second mobile device 110 (recipient). In this regard, preconditions for the successful completion of the transfer of money between mobile devices 105, 110 include the assumption that the first mobile device 105 and the second mobile device 110 are NFC enabled; a payment provider service application 126, NFC service application, or bundled application is present on the sender's 140 mobile device 105; and the sender 140 has a previously established payment provider account 132.

In this regard, the application(s) setup may be facilitated over-the-air (OTA), wherein depending on implementation, an OTA application/software download may be initiated upon an action, such as a call to the payment provider system 120 or other dialable service, or can be performed automatically when visiting a service site.

Alternatively, the application(s) setup may be facilitated by using another NFC chip, wherein for example, a pre-loaded NFC card issued by the payment provider system 120 or other entity may be pre-loaded with a basic application, account information, URL, etc., such that when touched to an NFC enabled mobile device the information is transferred to the mobile device to permit access to an OTA site where the payment provider application/software download can be initiated.

Figure 7:
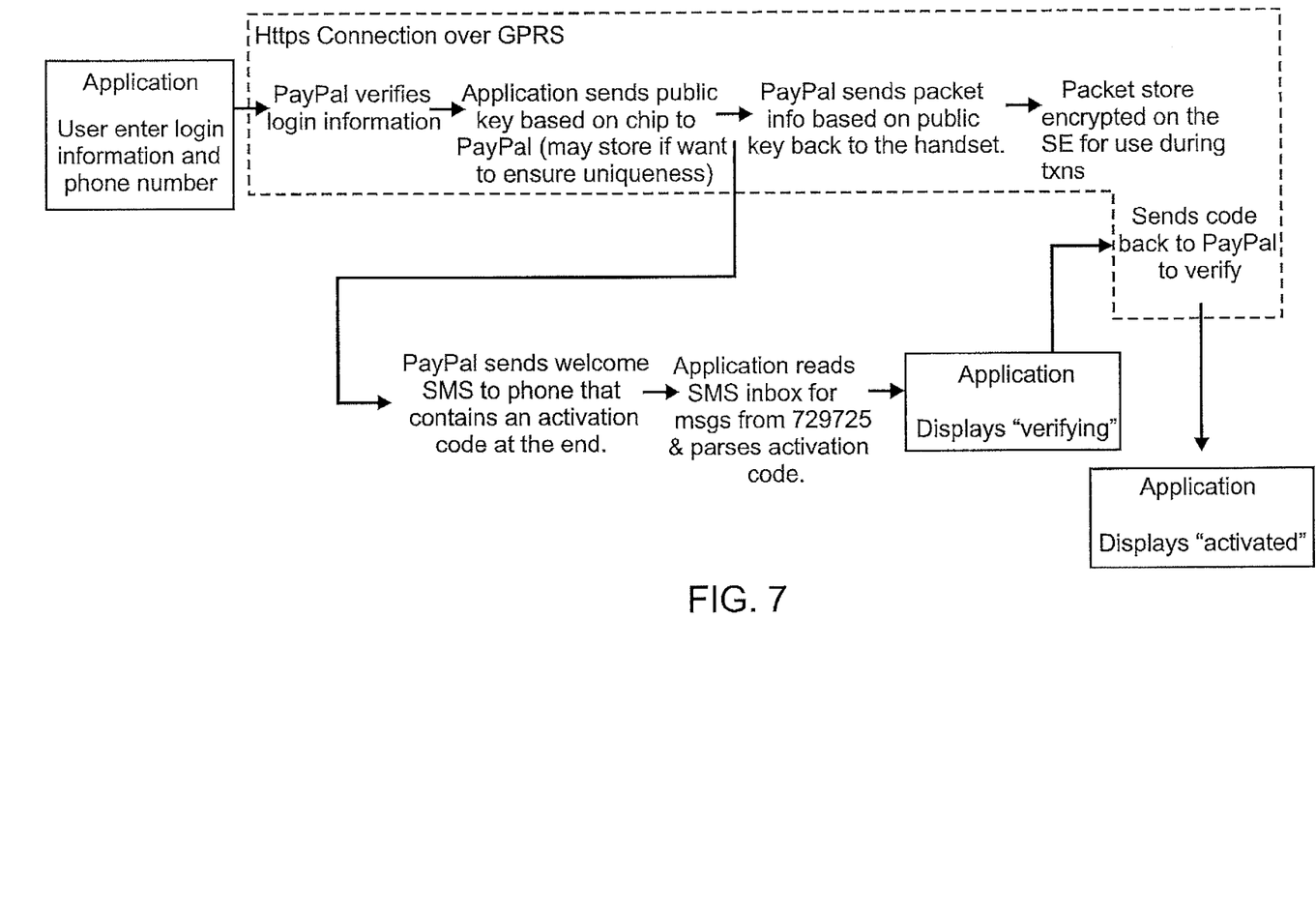
FIG. 7 shows application(s) activation in accordance with one embodiment.

In one embodiment, an initial payment provider application activation process may be required to be completed prior to utilizing the application(s) 126-129 for the first time. In this regard, as shown in FIG. 7, application(s) activation may begin with the user entering login information such as phone number, pin number, email address and/or password, etc., in the mobile device 105, 110. The application forwards the information and a public key (unique identifier) 125 based on the NFC mobile device's chip to the payment provider system 120. In one embodiment, network connectivity for the communication of voice and/data between the mobile device 105, 110 and the payment provider system 120 may be facilitated by an HTTPS (Hyper Text Transfer Protocol Secure) connection over a general packet radio service (GPRS). GPRS is a packet based wireless communication service that offers continuous connection to the Internet or other network 115 for mobile phone and computer users. GPRS is based on GSM (Global System for Mobile Communication) and complements existing services such as circuit switched cellular phone connections and the Short Message Service (SMS), i.e., text message. Persons of skill in the art will understand similar protocols and wireless services may be utilized within the scope of the disclosure to enable wireless connectivity and communication between the mobile devices and the payment service provider.

In response to receiving the user's information and unique identifier, the service provider system 120 sends packet information to the mobile device 105, 110. The packet information from the payment provider system 120 to the mobile device may include data relating to country, currency, language, activation code and/or security keys. A corresponding code generated by the application is then communicated back to the payment provider system 120 from the mobile device 105, 110.

In this regard, such a back-and-forth communication or "handshake" between the mobile device 105, 110 and the payment provider system 120 allows for user and/or system verification, authorization, and compatibility check to complete the application(s) activation process. Typically, the user 140, 145 is then notified that the application is activated. Packet information previously sent from the payment provider system 120 to the mobile device 105, 110 is stored on the chipset for future use when activating the application(s) 126-129. The payment provider system 120 may further communicate a short welcome text message to the mobile device 105, 110.

After the initial setup and activation of the application(s) is complete, subsequent activation of one or more of the application(s) may occur upon activation of the mobile device. In one embodiment, the mobile device 105 may be a cell phone in which activation may occur upon opening the mobile device 105. In another case, the sender 140 may be required to touch a feature (icon, pushbutton, etc.) on the mobile device 105 to access and activate one or more of the application(s). In still another case, activation of one or more of the applications may occur upon "tapping" or bringing the mobile device 105 in close proximity with another NFC enabled device.

Upon activation of the mobile device 105, the sender 140 may be presented with menu options for enabling various functions including those associated with multimedia features, e.g., music, video, games, etc., user contact information, and those relating to financial transactions such as "request money", "send money", etc.

The sender 140 would then choose the desired function from the menu options, for example, "send money" in the case of a proposed money transfer between the mobile devices 105, 110. In one embodiment, the sender 140 would asked to enter, in no particular order, funding particulars including the funding source e.g., MC, VISA, AMEX, Citibank, PPS account, or other funding source, the amount of money to be sent, and login information (PIN, passcode, password, etc.).

Persons of ordinary skill in the art will understand that in the absence of an affirmative choice of one or more presented funding particulars preset default settings may be enabled. In addition, the sender 140 will typically have the opportunity to review and edit the payment choices prior to communicating the payment request to the payment provider system 120.

Upon activation of the mobile device 110 the recipient 145, like the sender 140, may be presented with menu options for enabling various functions including those associated with multimedia features, e.g., music, video, games, etc., user contact information, and those relating to financial transactions such as "request money", "send money", etc.

The recipient 140 of the intended money transfer would then choose the desired function from, for example, "receive money" or "ready, wait" (a default setting having implications of what is being shared) in the case of the above described proposed money transfer between the mobile devices 105, 110. In one embodiment, by choosing the "receive money" function the recipient implicitly/explicitly agrees to provide certain designated information such as email address, phone number, account information, etc., to facilitate funding by the payment provider system 120 to the designated recipient account, digital wallet (phone), or email address where funds may be deposited or acquired.

The sender 140 then touches or "taps" the NFC enabled mobile device 110 of the recipient 145 to enable the transfer of the designated recipient information from the recipient's mobile device 110 to the sender's mobile device 105 via NFC.

Persons of ordinary skill in the art will understand that although the method(s)/step(s) are illustrated and described herein as occurring in a certain order, the specific order, or any combination or interpretation of the order, is not required. Obvious modifications will make themselves apparent to those of ordinary skill in the art, all of which will not depart from the essence of disclosed subject matter, and all such changes and modifications are intended to be encompassed within the scope of the disclosure.

For example, recipient information may be acquired prior to selecting the funding source and/or the monetary amount to be sent by the sender 140. In this regard, the acquisition of recipient information may automatically activate the "send money" function on the sender's mobile device 105 thereby presenting the menu options for enabling various functions including those relating to financial transactions, as described above.

The sender's payment request is then automatically communicated (submitted) to the payment provider system 120 for processing including, among others, verification, authorization, distribution, and confirmation. Alternatively, the sender 140 may review the payment request information prior to submission of the payment request to the payment provider system 120.

Upon completing payment processing the payment provider system may communicate a SMS notification, i.e., successful transfer of funds, successful deposit of funds, amount of transfer or deposit, or some other related message informing the sender 140 and/or recipient 145 of the payment processing results such as an email, phone call, or a multimedia messaging service (MMS) message. Sender 140 and/or recipient notifications may further include an audio, visual, and/or tactile indication such as a vibration in the respective device.

In summary, in one embodiment, contact information transfer is communicated directly via NFC from the recipient's mobile device 145 to the sender's mobile device 140. Payment review is done via NFC from the sender's mobile device 140 to the recipient's mobile device 145 showing the conditions of the financial transaction. The payment request is communicated OTA to the payment provider system 120 in real-time, while notifications and confirmations are communicated to the sender's mobile device 140 and the recipient's mobile device via SMS and/or MMS and/or other form of indicator.

As described above, peer-to-peer payment between mobile devices 105, 110 may be facilitated using near field communication in a network environment. In this regard, objects such as mobile devices 105, 110 may be augmented with a chip to permit users to gather information and/or conduct financial transactions. Such transactions include the payment for goods, receiving money, transferring money, and transferring and receiving user information.

With reference to FIG. 6, in one embodiment, a financial transaction may comprise a two step or "two-tap" process between NFC enabled mobile devices 105 and 110 in which a first "tap" between the devices communicates contact information e.g., cell phone number or email address, and a second "tap" between the devices communicates the payment request to the payment provider system 120. As discussed above, the sender 140 may be given the opportunity to review and edit certain of the details of the transaction, e.g., payment amount, funding account, after affecting the first tap and before effecting the second.

In the two-tap embodiment, a money transfer or financial transaction between the respective NFC enabled devices 105 and 110 of a sender 140 and a recipient 145 is facilitated by a third party service provider 120, such as PayPal, and comprises: 1) the sender 140 entering a payment request (e.g., amount, funding instrument, and the like) into his or her NFC device 140, 2) the sender then gathering recipient information via a first tap between the respective NFC devices, 3) the sender then sending the request to the third party provider 120, which is effected by a second tap between the two devices, and 4) the service provider 120 sending confirmation of the transaction to the sender and recipient. The two NFC devices 105 and 110 may connect, for example, to the Internet to effect the money transaction, and additional information can be transferred along with payment, such as user ID, avatars, icons, and the like. Once the transaction is in progress or completed, the users may be notified, such as by means of an audio and/or visual indication and/or a vibration of the respective NFC devices.

In an alternative embodiment, as shown in FIG. 6C, after entry of the payment request, contact information gathering and payment request communication with a service provide, as described above, may be affected with a single tap between NFC enabled mobile devices 105 and 110.

The systems and methods for payment between mobile devices 105 and 110 using near field communication in a network environment may be utilized to facilitate an "open loop" financial transaction in which a one time virtual credit card or debit account is issued by the payment provider system 120 and used by a merchant so that the user and merchant view the process as a standard financial transaction.

Alternatively, the systems and methods for payment between mobile devices 105 and 110 using near field communication in a network environment may be utilized to facilitate a "closed loop" financial transaction in which the payment provider system 120 provides POS terminals for merchants. In this regard, a user can "tap" his or her mobile device 105 on the POS terminal to pay for merchandise and the merchant is paid directly through the payment provider system 120.

Figure 8A:
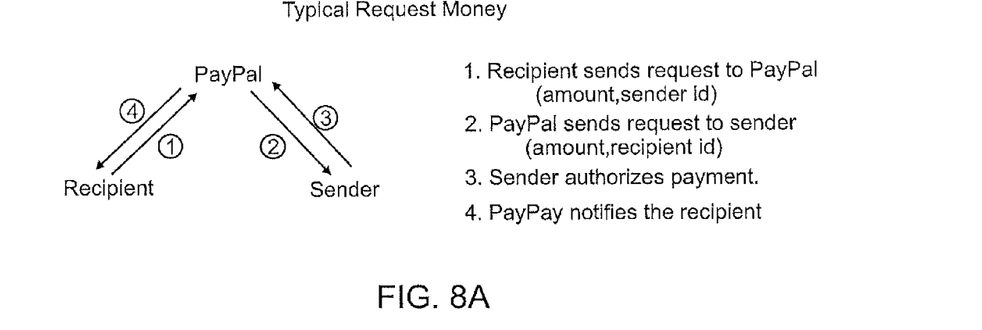
FIGS. 8A and 8B show a typical "known" request for money and a contrasting request for money in a peer-to-peer financial transaction between mobile devices using near field communication in a network environment in accordance with one embodiment.
Figure 8B:
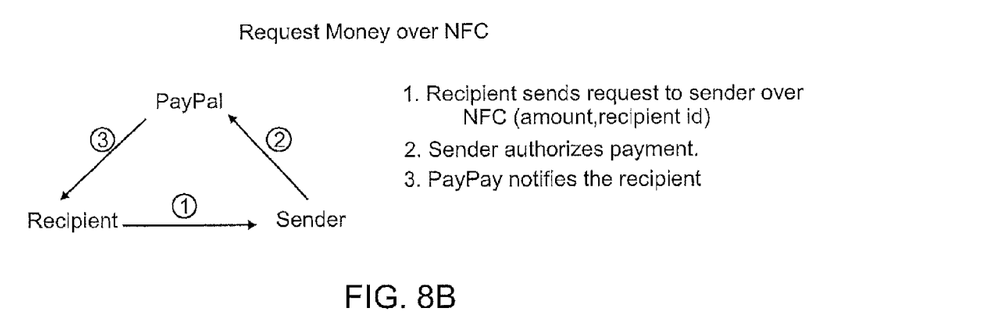

FIGS. 8A and 8B respectively illustrate a typical "known" request for money and a contrasting request for money in a peer-to-peer financial transaction between mobile devices using near field communication in a network environment in accordance with one embodiment of the present invention.

In contrast to the known four-step process for requesting money, a money request utilizing NFC includes a first step of (1) the recipient sending a request for money to the sender via NFC, a second step of (2) the sender authorizing payment with the payment provider system via OTA, and a third step of (3) the payment provider system notifying the recipient of the transfer of funds. In this regard, by communicating information via NFC, the sender only needs to enter a PIN to approve payment with the payment provider system.

Similar to the money request disclosed in FIG. 8B, a "charge for a service" may be conducted in a peer-to-peer financial transaction between mobile devices using near field communication in a network environment in accordance with one embodiment. In this regard, in the first step of FIG. 8 data content, for example a music download, may be communicated to the sender's mobile device along with a money request for the music download from the recipient's mobile device via NFC. If the sender agrees to the purchase or sending of money for the music download the process would continue as disclosed in step (2) and step (3) above.

Figure 9:
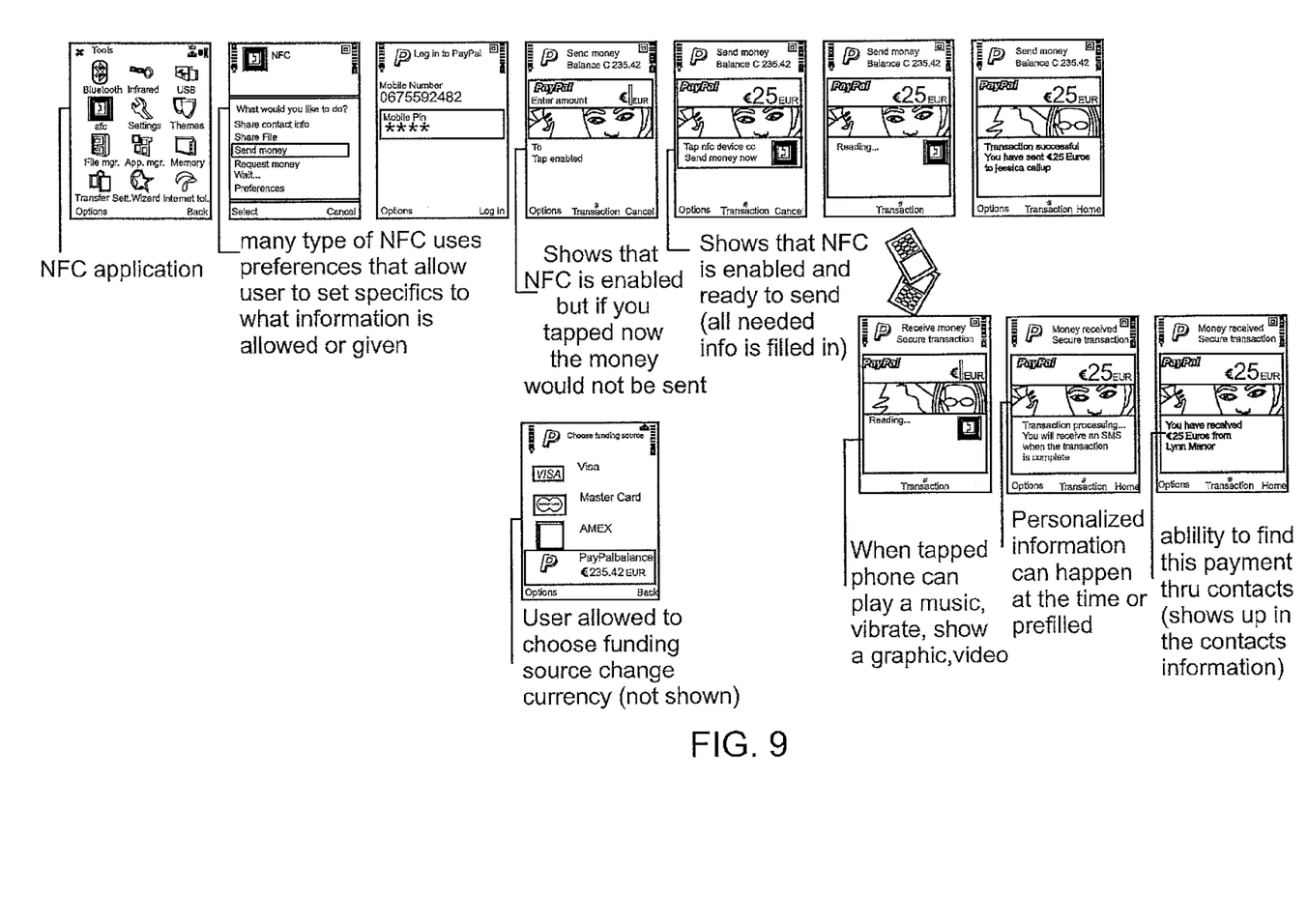
FIG. 9 shows examples of various interface screens that be applicable to a sender's mobile device and/or a recipient's mobile device for conducting a peer-to-peer financial transaction between mobile devices using near field communication in a network environment in accordance with one embodiment.

FIG. 9 shows examples of various interface screens that can be displayed on a sender's and/or a recipient's mobile device for conducting a peer-to-peer financial transaction between two mobile devices using near field communication in a network environment in accordance with one embodiment of the present disclosure.

Although the systems and methods of the present invention have been described and illustrated herein with reference to certain specific example embodiments thereof, it should be understood that a wide variety of modifications and variations may be made to these without departing from the spirit and scope of the invention, as defined by the claims appended hereafter and their functional equivalents.

What is claimed is:

1. A transaction processing system, comprising:
   a non-transitory memory; and
   one or more hardware processors coupled to the non-transitory memory and configured to read instructions from the non-transitory memory to cause the transaction processing system to perform operations comprising:
      determining that a money transfer request is received from a sender requesting a transfer of money from an account of the sender to an account of a recipient;
      detecting that a recipient device of the recipient is brought within an Near Field Communication (NFC) range of the transaction processing system;
      in response to the detecting, establishing an NFC link with the recipient device;
      automatically retrieving recipient information that identifies the account of the recipient from the recipient device via the NFC link; and
      sending the money transfer request and the recipient information to a payment provider device to cause the payment provider device to process the money transfer request.

2. The transaction processing system of claim 1, wherein the NFC link is established based on a physical contact between the transaction processing system and the recipient device.

3. The transaction processing system of claim 1, wherein the recipient information is retrieved from the recipient device in response to a first physical contact between the transaction processing system and the recipient device and the money transfer request is sent to the payment provider device in response to a second physical contact between the transaction processing system and the recipient device.

4. The transaction processing system of claim 3, wherein the operations further comprise:
   presenting a summary of the money transfer request for sender confirmation after the first physical contact and before the second physical contact.

5. The transaction processing system of claim 1, wherein the operations further comprise:
   receiving a user selection of a funding source via a payment application installed on the transaction processing system for making the transfer of money; and
   receiving a user input of an amount of the transfer of money via the payment application.

6. The transaction processing of claim 5, wherein the recipient information is retrieved before receiving the user selection of a funding source or receiving the user input of the amount of the transfer of money.

7. The transaction processing system of claim 1, wherein the operations further comprise:
   receiving a confirmation from the payment provider device after the transfer of money is successfully processed.

8. The transaction processing system of claim 1, wherein the operations further comprise:
   communicating login information and a public key to the payment provider device for activation and authorization of the payment application, wherein the login information comprises one or more of a phone number, a pin number, an email address, and a password;
   receiving packet data sent from the payment provider device in response to receiving the login information and the public key from the transaction processing system; and
   storing the packet data for subsequent activation of the payment application.

9. The transaction processing system of claim 8, wherein the packet data includes data associated with the transaction processing system and comprises one or more of a country, a currency, a language, or a security code.

10. The transaction processing system of claim 1, wherein the recipient device comprises one of a cell phone, a fob, a smartcard, a personal digital assistant (PDA), a smart phone, a computer, a personal computer (PC), or a point of purchase (POP) terminal.

11. The transaction processing system of claim 1, wherein the NFC link is established automatically in response to positioning the transaction processing system within a predetermined proximity to the recipient device.

12. A transaction processing method comprising:
   determining, by a device of a sender, that a money transfer request is received from the sender requesting a transfer of money from an account of the sender to an account of a recipient;
   detecting, by the device of the sender, that a recipient device of the recipient is brought within an Near Field Communication (NFC) range of the device of the sender;
   in response to the detecting, establishing, by the device of the sender, an NFC link with the recipient device;
   automatically retrieving, by the device of the sender, recipient information that identifies the account of the recipient from the recipient device via the NFC link; and
   sending, by the device of the sender, the money transfer request and the recipient information to a payment provider device to cause the payment provider device to process the money transfer request.

13. The method of claim 12, wherein the NFC link is established based on a physical contact between the device of the sender and the recipient device.

14. The method of claim 12, wherein the recipient information is retrieved from the recipient device in response to a first physical contact between the device of the sender and the recipient device and the money transfer request is sent to the payment provider device in response to a second physical contact between the device of the sender and the recipient device.

15. The method of claim 14, further comprising:
presenting, by the device of the sender, a summary of the money transfer request for sender confirmation after the first physical contact and before the second physical contact.

16. The method of claim 12, further comprising:
receiving, by the device of the sender, a user selection of a funding source via a payment application installed on the device of the sender for making the transfer of money; and
receiving, by the device of the sender, a user input of an amount of the transfer of money via the payment application.

17. The method of claim 16, wherein the recipient information is retrieved before receiving the user selection of a funding source or receiving the user input of the amount of the transfer of money.

18. The method of claim 12, further comprising:
receiving, by the device of the sender, a confirmation after the transfer of money is successfully processed.

19. A non-transitory machine-readable medium having stored thereon machine-readable instructions executable to cause a machine to perform operations comprising:
determining, by a device of a sender, that a money transfer request is received from the sender requesting a transfer of money from an account of the sender to an account of a recipient;
detecting that a recipient device of the recipient is brought within an Near Field Communication (NFC) range of the device of the sender;
in response to the detecting, establishing, by the device of the sender, an NFC link with the recipient device;
automatically retrieving, by the device of the sender, recipient information that identifies the account of the recipient from the recipient device via the NFC link; and
sending, by the device of the sender, the money transfer request and the recipient information to a payment provider device to cause the payment provider device to process the money transfer request.

20. The non-transitory machine-readable medium of claim 19, wherein the NFC link is established based on a physical contact between the device of the sender and the recipient device.

* * * * *